(12) United States Patent
Lane (10) Patent No.: US 7,707,882 B2
(45) Date of Patent: May 4, 2010

(54) GAUGE TO INDICATE THE LEVEL OF BEVERAGE HELD IN A BEVERAGE CONTAINER

(75) Inventor: Marvin Lane, Round Lake Beach, IL (US)

(73) Assignee: Thermos L.L.C., Rolling Meadows, IL (US)

( * ) Notice: Subject to any disclaimer, the term of this patent is extended or adjusted under 35 U.S.C. 154(b) by 482 days.

(21) Appl. No.: 11/349,585

(22) Filed: Feb. 8, 2006

(65) Prior Publication Data

US 2007/0181585 A1 Aug. 9, 2007

(51) Int. Cl.
*G01F 23/30* (2006.01)
*G01F 23/32* (2006.01)
(52) U.S. Cl. .................. 73/305; 73/290 R; 73/309; 73/317; 73/319
(58) Field of Classification Search ............... 73/290 R, 73/305, 306, 607, 309, 311, 314, 317, 318, 73/319, 322.5, 307
See application file for complete search history.

(56) References Cited

U.S. PATENT DOCUMENTS

| 1,626,789 | A | * | 5/1927 | Creed | 73/306 |
| 1,786,339 | A | * | 12/1930 | Ford | 73/320 |
| 2,255,310 | A | * | 9/1941 | D'Arcey | 73/317 |
| 2,653,478 | A | * | 9/1953 | Harper | 73/309 |
| 2,882,729 | A | * | 4/1959 | Weiser | 73/317 |
| 2,889,708 | A | * | 6/1959 | Williams | 73/317 |

\* cited by examiner

*Primary Examiner*—David A. Rogers
(74) *Attorney, Agent, or Firm*—Wood, Phillips, Katz, Clark & Mortimer (57) ABSTRACT

An insulation beverage container (10) is provided and includes a gauge (40) for indicating the level of beverage held in the container (10). The gauge (40) includes a float (42) positioned within the container (10), a visual indicator (44) extending outside of the container (10), and a link (46) connecting the float (42) to the indicator (44) to move the indicator (44) with the float (42) as the position of the float (42) varies with the level of the beverage in the container (10).

12 Claims, 8 Drawing Sheets

Fig. 16

GAUGE TO INDICATE THE LEVEL OF BEVERAGE HELD IN A BEVERAGE CONTAINER

FIELD OF THE INVENTION

This invention relates to apparatus for determining the level of beverage contained in a beverage container, and in more particular applications to determining the level of beverage contained in insulated and/or nontransparent beverage containers.

BACKGROUND OF THE INVENTION

Some beverage containers, particularly those that are insulated, do not provide an adequate view of the beverage contained therein in order to determine the level of the beverage held in the container, i.e., how full the container is. Examples of such beverage containers include coffee pots or servers and coffee urns, such as gravity feed servers with a spout located at or near a bottom of the server to dispense the beverage. For these types of beverage containers, one known gauge is provided in the form of a vertical glass tube that is connected by various plumbing between the bottom of the container and the spout. U.S. Pat. No. 6,505,752 shows a similar gauge that is built into the handle of a coffee server. While these constructions may work well for their intended purpose, there are some disadvantages. For example, the structure of these known gauges can be complicated, difficult to clean, and/or expensive to manufacture or maintain. Cleaning can be particularly important in the restaurant industry due to NSF (National Sanitation Foundation) cleaning standards.

SUMMARY OF THE INVENTION

In accordance with one form of the invention, an insulated beverage container is provided and includes an insulated body surrounding a beverage holding volume, a lid located above the volume, and a gauge to indicate the level of beverage held in the container. The gauge includes a float positioned within the container, a visual indicator extending outside of the container, and a link connecting the float to the indicator to move the indicator with the float as the position of the float varies with the level of beverage in the container. The link includes a rod that is slidably received in the lid of the container to allow for linear movement of the rod relative to the lid and the container.

According to one form of the invention, a gauge is provided for a beverage container, the gauge indicating the level of beverage held in the container. The gauge includes a float positioned within the container, a visual indicator extending outside of the container, and a link connecting the float to the indicator to move the indicator with the float as the position of the float varies with the level of beverage in the container. The link includes a rod that is slidably received in a lid of the container to allow for linear movement of the rod relative to the lid and the container.

In one form, the rod is connected directly to the float.

According to one form, the link further includes a pivot mounting the float for pivotal movement within the container; and a guide arm extending between the float and the pivot, with the rod connected to said arm to transmit the pivotal movement of the float to the rod.

In accordance with one form, the guide arm includes a linear slot and the rod includes a tab slidably received in said slot.

In one form, the rod engages the guide arm over a portion of the guide arm that is closer to the pivot than the float.

According to one form, the pivot includes an end of the guide arm pivotably engaged with a bracket extending downward from the lid into the container.

In one form, the end of the guide is snap fit to an axle on said bracket.

In accordance with one form, the indicator includes an end of the rod.

According to one form, the indicator includes a rotatable shaft mounted on the lid, and a pinion on the shaft; and the link includes a rack on the rod and engaged with the pinion to transmit the linear motion of the rod to the rotatable shaft.

In one form, the indicator includes a pivotable arm mounted on the lid; and the link includes a cam on the rod and engaged with the indicator arm to transmit the linear motion of the rod to the pivotable arm.

Other objectives, aspects, and advantages of the invention will be realized from a detailed review of the entire specification, including the appended drawings and claims.

DETAILED DESCRIPTION OF THE PREFERRED EMBODIMENTS

Figure 1:
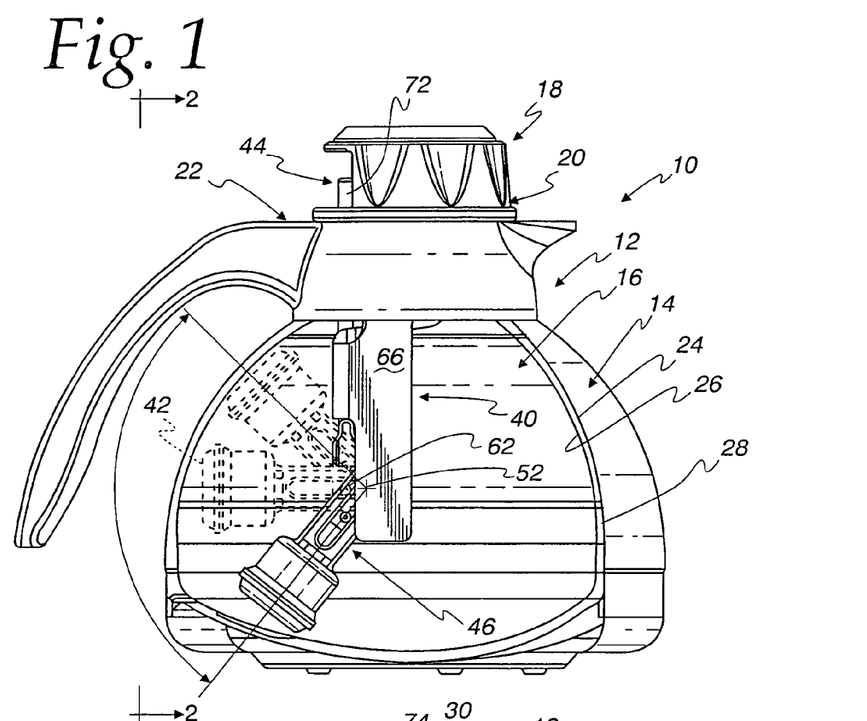
FIG. 1 is a partial section view of an insulated beverage container incorporating a gauge in body of the invention.
Figure 2:
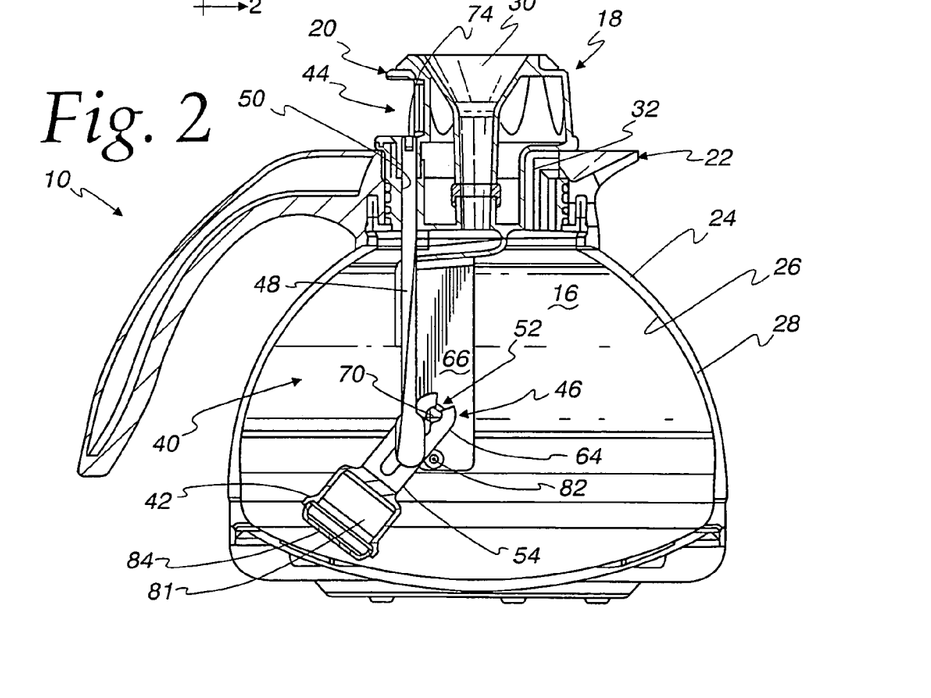
FIG. 2 is a complete sectioned view of the beverage container in gauge of FIG. 1.
Figure 3:
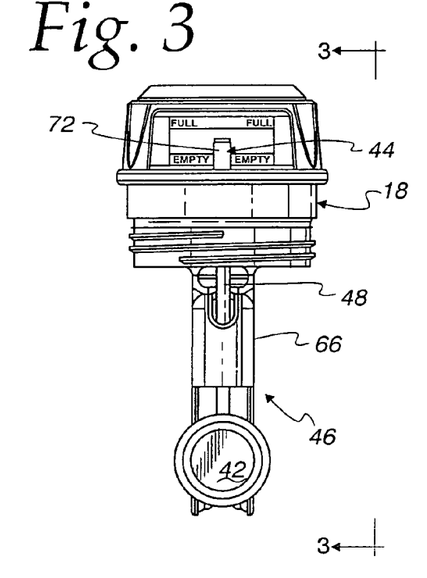
FIG. 3 shows a lid in the gauge of FIG. 1 taken from line 3-3 in FIG. 1.

With reference to FIGS. 1 and 2, an insulated beverage container 10 is provided in the form of a coffee server 12 that includes an insulated body 14 surrounding a beverage holding volume 16, and a lid 18 in the form of a stopper 20 that is located above the volume 16. The coffee server also includes an integral spout and handle 22 that are mounted to the top of the body 14 and receive the stopper 20. As best seen in FIG. 2, the insulated body 14 includes an outer body or shell 24 and an inner body or liner 26 with an insulating space 28 between the bodies 24 and 26. It should be appreciated that while the inner and outer bodies 24 and 26 and insulating space 28 are shown, there are many known ways to provide insulation for a beverage container and no limitation is intended herein unless expressly recited in the claims.

With reference to FIG. 2, the stopper 20 is of the type commonly referred to as a "brew through" stopper with a funnel shaped access port 30 where accepting a brew stream from an automatic coffee maker and a second port 32 that allows the beverage to exit the volume 16 for pouring via the spout 22. It should be appreciated that while a particular form of stopper is shown, there are many known types of stoppers, some of which may be desirable in some applications of the invention. Accordingly, no limitation to the particular details or type of stopper 20 is intended unless expressly recited in the claims.

A gauge, shown generally at 40, is provided in the container 10 and includes a float 42 positioned within the container 10 (shown in three different angular positions in FIG. 1), a visual indicator 44 extending outside of the container 10, and a link, shown generally at 46, connecting the float 42 to the indicator 44 to move the indicator 44 with the float 42 as the position of the float 42 varies with the level of beverage in the container 10. As best seen in FIG. 2, the link includes a rod 48 that is slidably received in the lid 18 to allow linear movement of the rod 48 relative the lid 18 and the container 10. In this regard, again with reference to FIG. 2, it can be seen at the rod 48 is slidably received in a hole 50 that is formed in the lid 18 and which has a complementary shape to the exterior of the rod 48, which in the illustrated embodiment is cylindrical.

Figure 4:
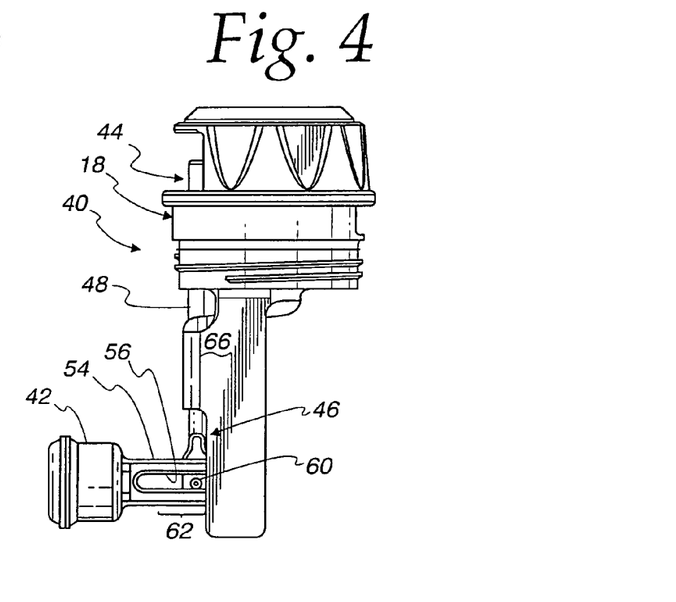
FIG. 4 is a view taken from line 4-4 in FIG. 3.
Figure 5:
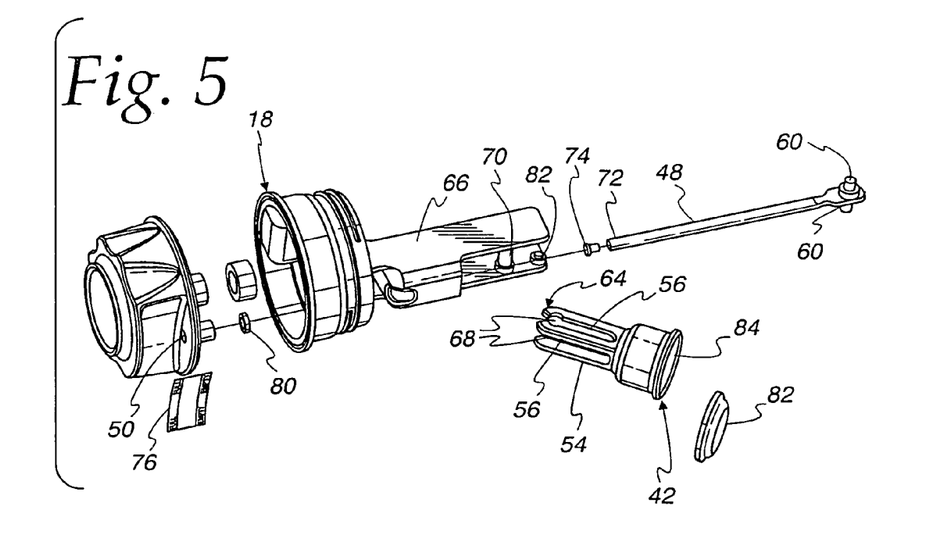
FIG. 5 is an exploded perspective view of the components shown in FIGS. 3 and 4.

In the embodiment of FIGS. 1 and 2, the link 46 further includes a pivot, shown generally at 52, mounting the float 42 for pivotal movement within the container 10, and a guide arm 54 extended between the float 42 and the pivot 52, with the rod 48 connected to the arm 54 to transmit the pivotal movement of the float 42 to the rod 48. As best seen in FIGS. 4 and 5, the guide arm 54 includes a pair of linear slots 56, each of which slidably receives a tab or axle 60 that is part of the rod 48. Preferably, the rod 48 engages the guide arm 54 over a portion 62 of the guide arm 54 that is closer to the pivot 52 than the float 42, as best seen in FIGS. 1 and 4. This allows for the relatively large pivotal movement of the float 42 to be transmitted as relatively smaller linear movement in the vertical direction of the rod 48, which is desirable because it allows for a practical range of motion of the indicator 44. The pivot 52 includes an end 64 of the guide arm 54 that is pivotably engaged with a bracket 66 extending downward from the lid 18 into the container 10. Preferably, the end 64 includes a pair of resilient, snap fit openings in 68 that are snap fit to an axle 70 carried on the bracket 66.

The indicator 44 of this embodiment is provided in the form of an end 72 of the rod 48 and, while not required, may preferably include a brightly colored button 74 that is carried on the end 72. It should be understood, that in some applications, it may be desirable not to have any kind of brightly colored feature for the indicator 44 or that the brightly colored feature could be provided in other forms, such as by paint, rather than by the button 74. Similarly, while not required, it is preferred that some sort of indicia be included on the lid 10 so as to better determine the position of the indicator 44 relative to the lid 18 and the container 10. In this embodiment, the indicia is provided in the form of a decal 76 with a lower horizontal line labeled as empty and an upper horizontal line labeled as full. Also, while not required, it may be desirable to provide a gasket 80 to help resist leakage of the beverage from the opening 50 that receives the rod 48. Similarly, again while not required, it may be desirable for the bracket 66 to include a stop 82 that limits the amount of downward pivotal movement of the float 42 by engaging the guide arm 54, as best seen in FIG. 2.

Although any suitable construction can be used, in the illustrated embodiment, the float 42 and the guide arm 54 are a unitary piece with a cap 84 sealing a hollow space 86 within the float 42 to provide buoyancy.

Another embodiment of an insulated beverage container 10 is shown in FIGS. 6-9 in the form of an insulated, gravity feed server 90 with a slightly modified version of the gauge 40. The gravity feed beverage server 90 is similar to the coffee server 12 of FIGS. 1-5 in that it has a double walled 24,26 body 14 with an insulating space 28, but differs in that the beverage is dispensed through a spout 92 located at the bottom of the server 90. Thus, the lid 94 of the server 90 does not include any opening for pouring beverage from the volume 16, but does include the funnel shaped access port 30.

Figure 6:
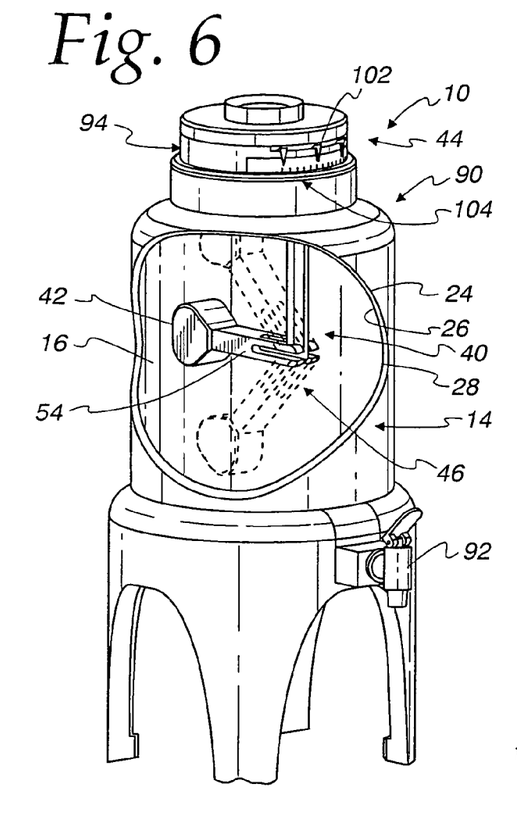
FIG. 6 partially broken perspective view of an insulated gravity feed beverage container incorporating a gauge embodying the present invention.
Figure 7:
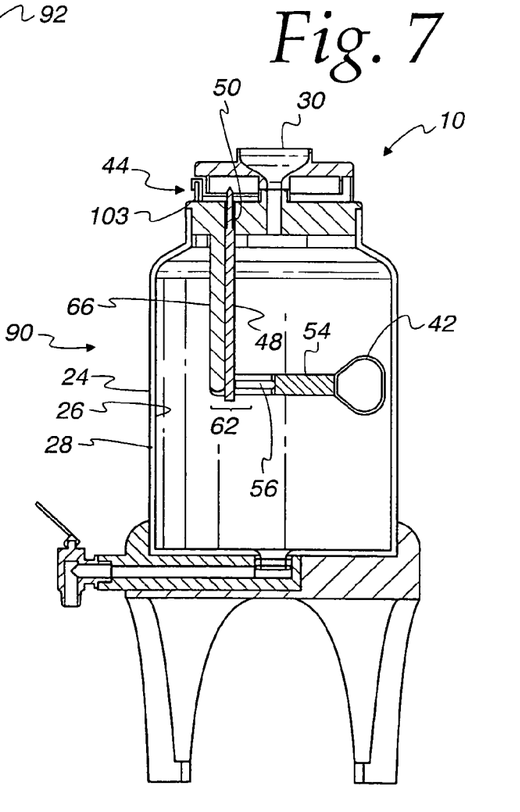
FIG. 7 is a section view of the container in gauge of FIG. 6.
Figures 8, 9:
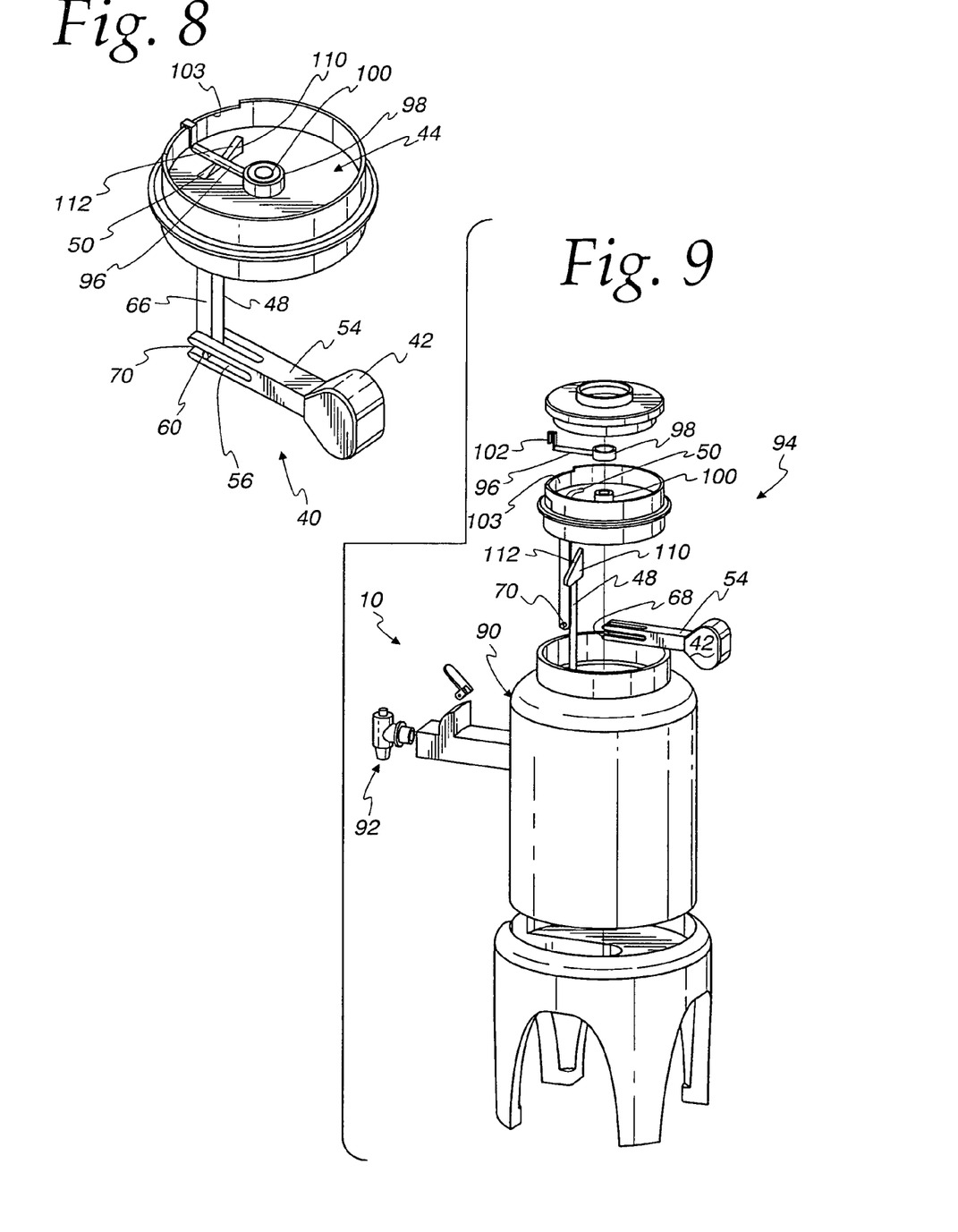
FIG. 8 is a perspective view from above of the gauge and components of a lid of the beverage container of FIG. 6.
FIG. 9 is an exploded perspective view of the beverage container of FIG. 6.
Figure 10:
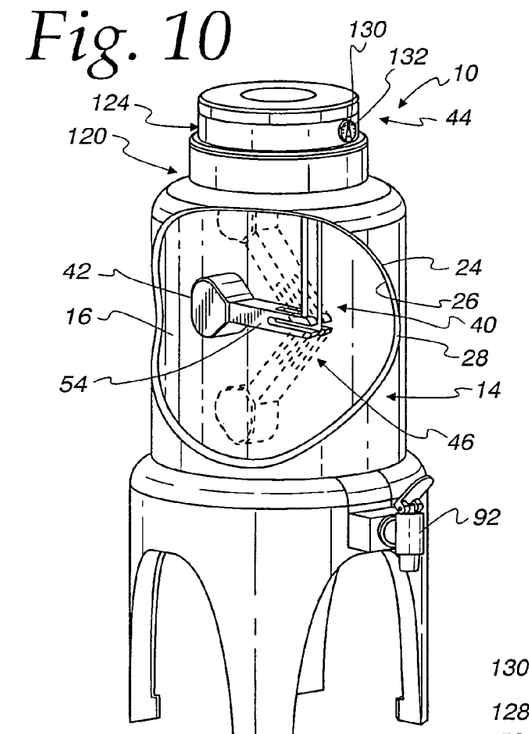
FIG. 10 is a partially broken view of insulated, gravity feed beverage container incorporating a gauge embodying the present invention.
Figure 11:
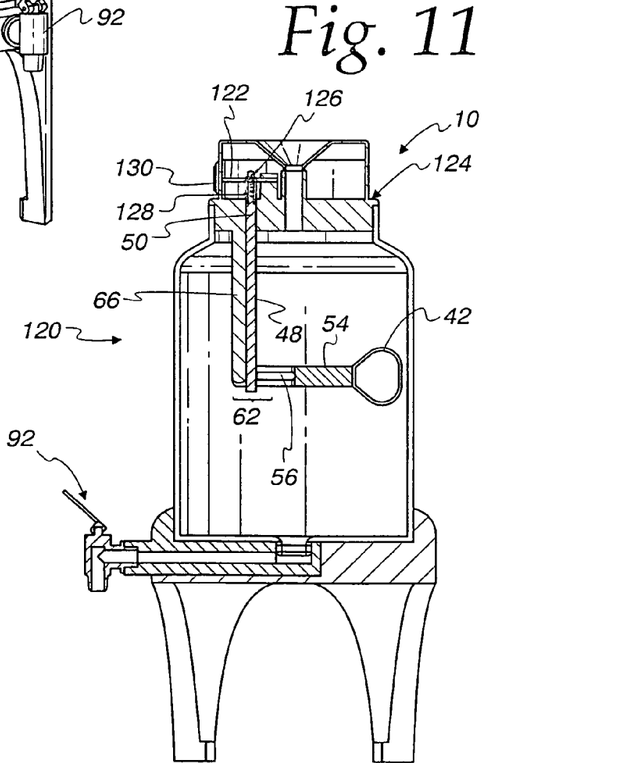
FIG. 11 is a section view of the container in gauge of FIG. 10.
Figure 12:
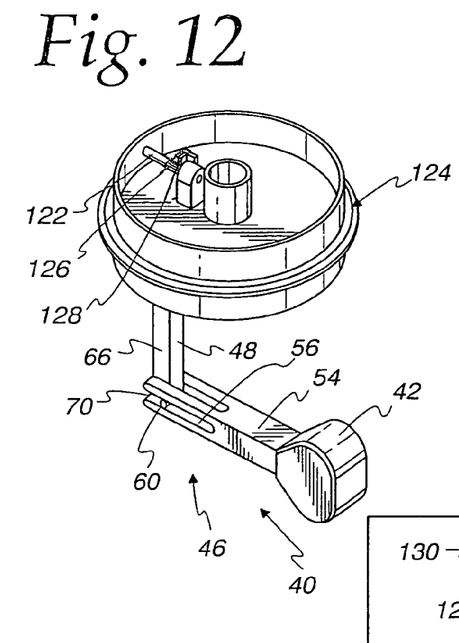
FIG. 12 is a perspective view from above of the gauge and components of a beverage container of FIG. 10.
Figure 13:
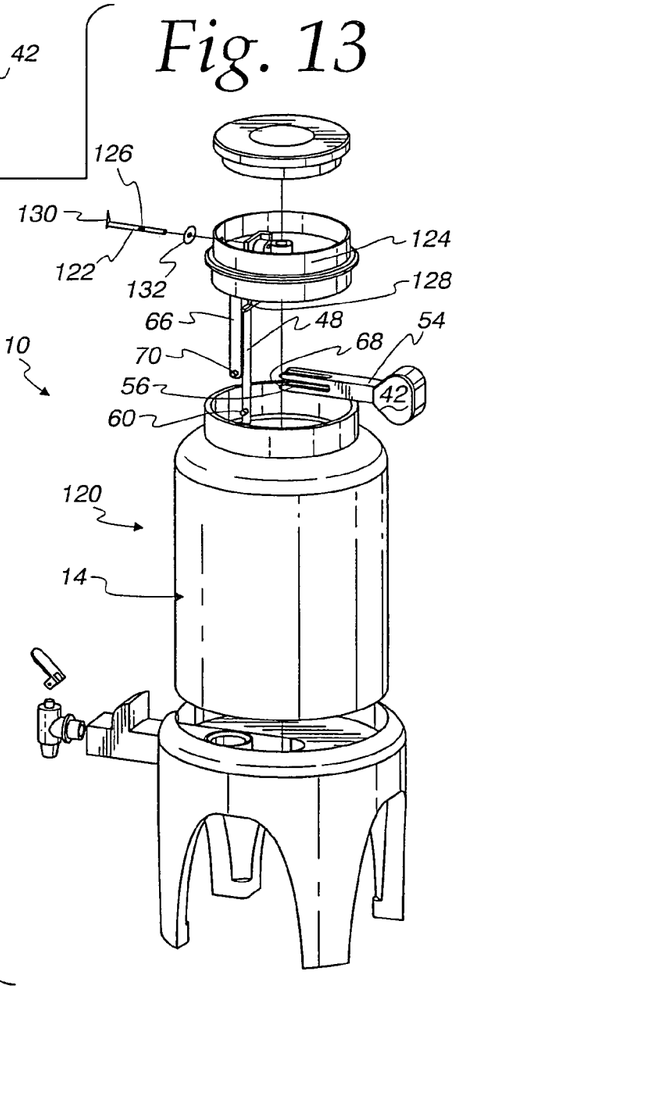
FIG. 13 is an exploded perspective view of the beverage container of FIG. 10.

The gauge 40 of FIGS. 6-9 differs from the gauge 40 of FIGS. 1-5 in that the indicator 44 is of a more complex construction. Specifically, the indicator 44 of FIGS. 6-9 includes a pivotal arm 96 that is mounted on the lid 94 to pivot about a vertical axis between two angular extremes, with one extreme representing the position of the indicator 44 when the container 90 is empty and the other angular extreme representing the position of the indicator 44 when the container 90 is filled with beverage. The arm 96 includes a collar 98 is mounted over a cylindrical post 100 for pivotal movement of the arm 96. A pointer 102 is provided on the arm 96 at the opposite end from the collar 98 and preferably has a shape that conforms to a vertically extending, cylindrical wall 103 of the lid 94. As best seen in FIG. 6, the lid 94 can preferably include indicia 104 to indicate the various positions (three shown in FIG. 6) of the pointer 102 as the arm 96 moves between its angular positions. The rod 48 of the embodiment shown in FIGS. 6-9 includes a blade shaped cam 110 having a wedged shaped upper surface 112 that pushes against the arm 96 in order to transmit the linear motion of the rod 48 to the arm 96 to pivot the arm between its various positions. In this regard, with reference to FIG. 6 and FIG. 9, it can be seen that the shape of the cam surface 112 is such that when the rod 48 is in its lowest position, which corresponds to the lowest position of the float 42, the indicator arm 96 is pivoted to the empty position (clockwise-most position when viewed from above) and when the rod 48 is in its highest position, which corresponds to the highest position of the float 42, the cam surface 112 forces the arm 96 to the full position (counter-clockwise most position when viewed from above). Although it is not shown, it may be desirable to include some mechanism for biasing the arm 96 to the empty position so that it follows the cam surface 112 as the rod 48 moves towards its lowest position.

Another embodiment of an insulated beverage container 10 is shown in the form of a gravity feed coffee server 120 is shown in FIGS. 10-13 incorporating a modified version of the gauge 40. The gauge 40 shown in FIGS. 10-13 differs from the gauge 40 of FIGS. 6-9 in that the indicator 44 is provided in the form of a rotatable shaft 122 that is mounted on the lid 124 for rotation about a horizontal axis. A pinion 126 is provided on the shaft 122 for rotation therewith and is engaged with a rack 128 provided on the end of the rod 48. Thus, the linear, upward and downward movement of the rod 48 in response to the pivotal movement of the float 42 produces rotation of the shaft 120 as the rack 128 turns the pinion 126. A pointer 130 provided on an end of the shaft 122 provides a visual indication of the level of beverage in the container 120, preferably in connection with indicia 132 provided on the exterior of the lid 124.

Figure 14:
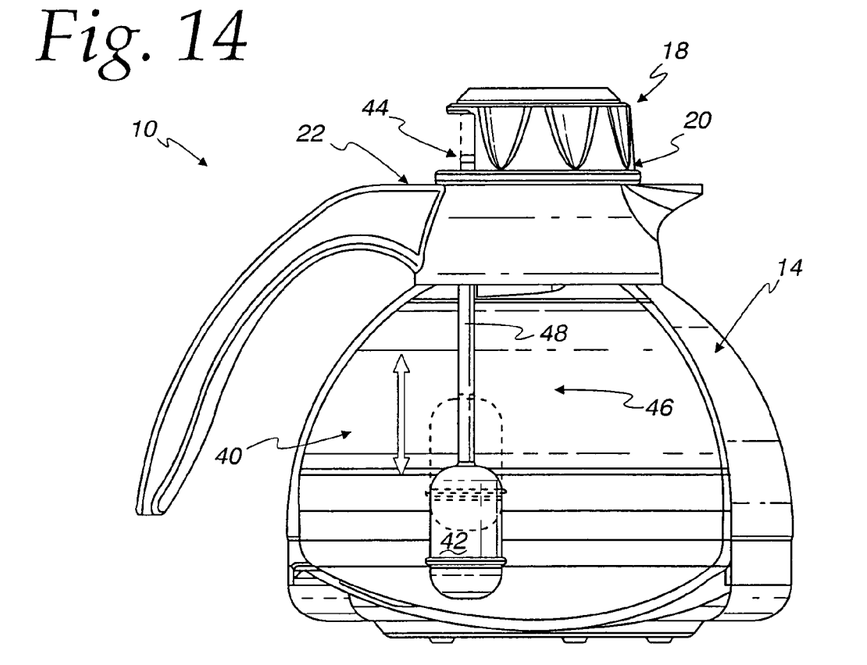
FIG. 14 is a partially broken elevation view of an insulated beverage server and gauge embodying the present invention.
Figure 15:
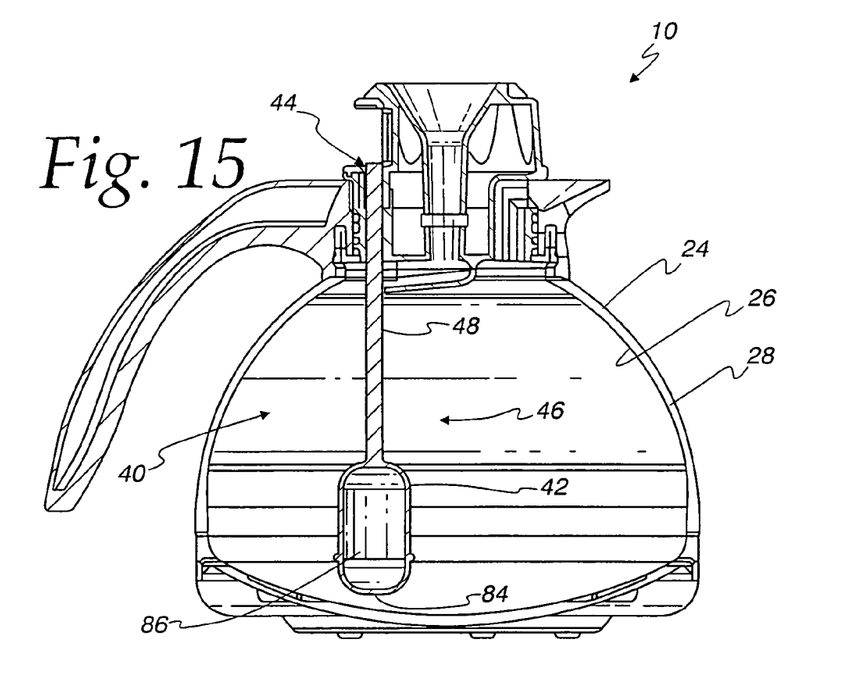
FIG. 15 is a section view of the insulated beverage container in gauge of FIG. 14.
Figure 16:
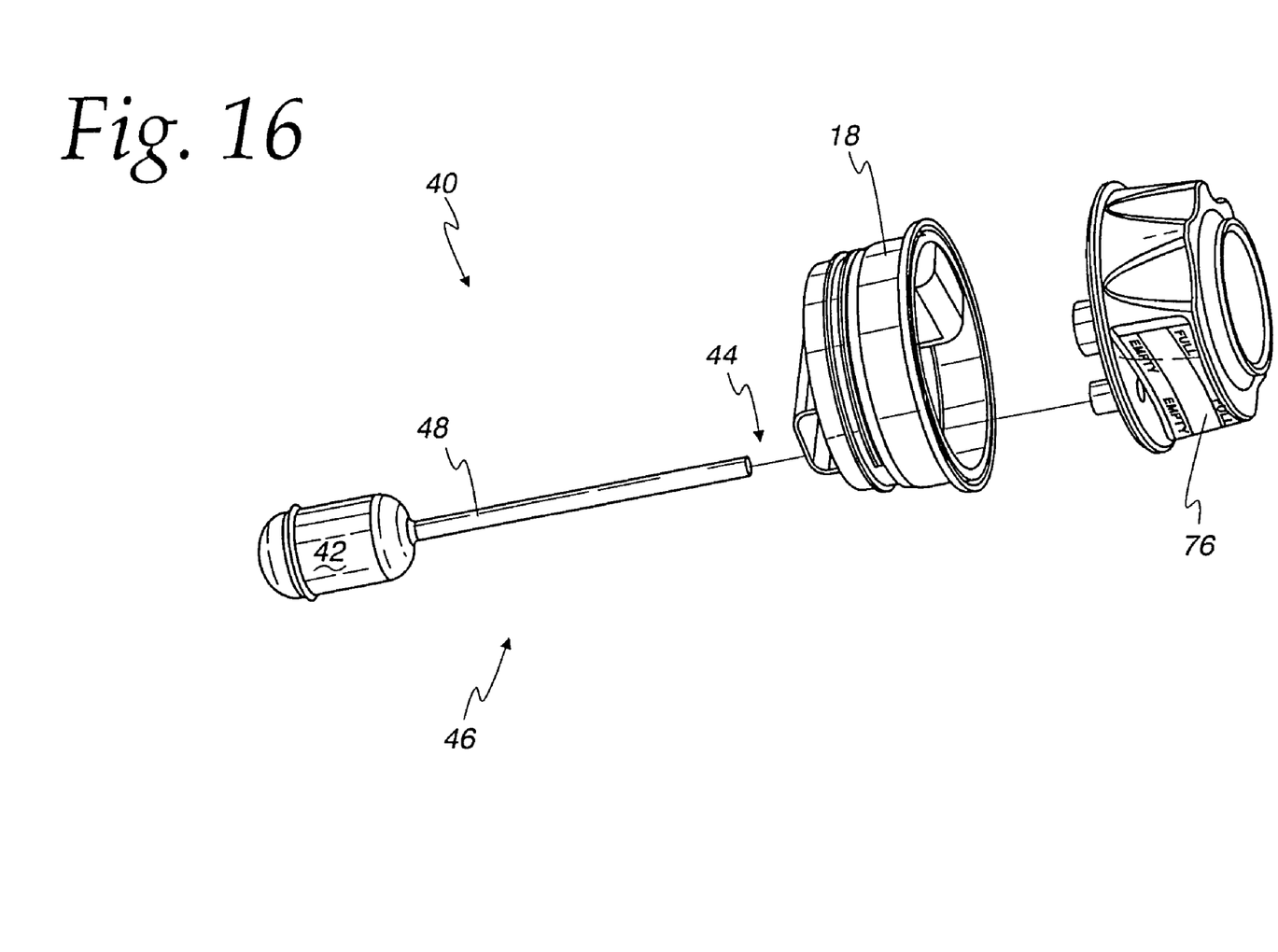
FIG. 16 is an exploded perspective view of the gauge and a lid component of FIGS. 14 and 15.

FIGS. 14-16 illustrate an embodiment of the coffee server 12 shown in FIGS. 1-5, but utilizing yet another modified embodiment of the gauge 40. In this embodiment, the link 46 has been greatly simplified and is provided in the form of the rod 48 being connected directly to the float 42, thereby eliminating the pivot 52 and the guide arm 54. The level of the beverage in the container 10 is indicated directly by the rod 48 as it moves up and down with the float 42.

For each of the above described embodiments, it is preferred that the components be designed with surfaces that are rounded or otherwise contoured to help insure that the components are easily cleaned so as to meet NSF cleanliness standards. Similarly, it is preferred that the materials for each of the components be FDA approved materials that are suitable for the temperatures of the beverages that will be held in the container 10.

It should also be understood that any of the various embodiments of the gauge 40 can be utilized with any of the above described embodiments of the insulated container 10. It should also be understood that the simplified link 46 of FIGS. 14-16 can be utilized with the embodiments of the indicator 44 shown in FIGS. 6-9 and 10-13.

It should also be appreciated that as used herein the term "lid" is intended to broadly refer to any closure for the upper opening of a beverage container, and is not limited to any of the specific forms shown in FIGS. 1-16.

The invention claimed is:

1. An insulated beverage container comprising:
    an insulated body surrounding a beverage holding volume;
    a lid located above the volume; and
    a gauge to indicate the level of beverage held in the container, the gauge comprising:
        a float positioned within the container;
        a visual indicator extending outside of the container; and
        a link connecting the float to the indicator to move the indicator with the float as the position of the float varies with the level of beverage in the container, the link comprising:
            a rod that is slidably received in the lid of the container to allow for linear movement of the rod relative to the lid and the container;
            a pivot mounting the float for pivotal movement within the container; and
            a guide arm extending between the float and the pivot, the rod connected to said arm to transmit the pivotal movement of the float to the rod;
            wherein the guide arm comprises a linear slot extending from the pivot toward the float, and the rod comprises a tab slidably received in said slot between the pivot and the float;
        wherein the guide arm further comprises another linear slot extending from the pivot toward the float on an opposite side of the rod from the other linear slot, and the rod further comprises another tab slidably received in said another slot.

2. The insulated beverage container of claim 1 wherein the pivot comprises an end of the guide arm pivotably engaged with a bracket extending downward from the lid into the container.

3. The insulated beverage container of claim 2 wherein the end of the guide is snap fit to an axle on said bracket.

4. The insulated beverage container of claim 1 wherein the indicator comprises an end of the rod.

5. The insulated beverage container of claim 1 wherein:
    the indicator comprises a rotatable shaft mounted on the lid, and a pinion on the shaft; and
    the link comprises a rack on the rod and engaged with the pinion to transmit the linear motion of the rod to the rotatable shaft.

6. The insulated beverage container of claim 1 wherein:
    the indicator comprises a pivotable arm mounted on the lid; and
    the link comprises a cam on the rod and engaged with the indicator arm to transmit the linear motion of the rod to the pivotable arm.

7. A gauge for a beverage container, the gauge indicating the level of beverage held in the container, comprising:
    a float positioned within the container;
    a visual indicator extending outside of the container; and
    a link connecting the float to the indicator to move the indicator with the float as the position of the float varies with the level of beverage in the container, the link comprising:
        a rod that is slidably received in a lid of the container to allow for linear movement of the rod relative to the lid and the container;
        a pivot mounting the float for pivotal movement within the container; and
        a guide arm extending between the float and the pivot, the rod connected to said arm to transmit the pivotal movement of the float to the rod;
        wherein the guide arm comprises a linear slot extending from the pivot toward the float, and the rod comprises a tab slidably received in said slot between the pivot and the float;
    wherein the guide arm further comprises another linear slot extending from the pivot toward the float on an opposite side of the rod from the other linear slot, and the rod further comprises another tab slidably received in said another slot.

8. The gauge of claim 7 wherein the pivot comprises an end of the guide arm pivotably engaged with a bracket extending downward from the lid into the container.

9. The gauge of claim 8 wherein the end of the guide is snap fit to an axle on said bracket.

10. The gauge of claim 7 wherein the indicator comprises an end of the rod.

11. The gauge of claim 7 wherein:
    the indicator comprises a rotatable shaft mounted on the lid, and a pinion on the shaft; and
    the link comprises a rack on the rod and engaged with the pinion to transmit the linear motion of the rod to the rotatable shaft.

12. The gauge of claim 7 wherein:
    the indicator comprises a pivotable arm mounted on the lid; and
    the link comprises a cam on the rod and engaged with the indicator arm to transmit the linear motion of the rod to the pivotable arm.

* * * * *